Figure 1:
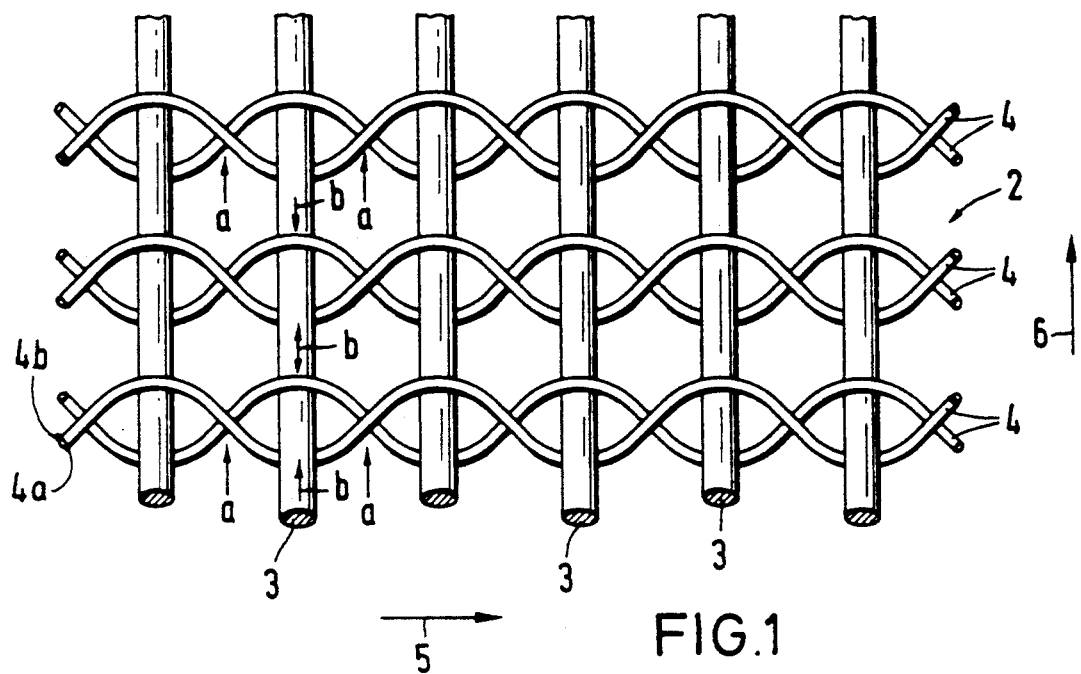

United States Patent [19]
Kölzer

[11] Patent Number: 5,292,578
[45] Date of Patent: Mar. 8, 1994

[54] MATERIAL FOR REINFORCING DUROPLASTICS WOVEN FABRIC FOR REINFORCING DUROPLASTICS HAVING A SPECIFIC DISTRIBUTION OF HOLLOW THERMOPLASTIC MICROSPHERES WITHIN THE THREAD SYSTEM

[76] Inventor: Klaus K. Kölzer, Benrather Schlossufer 65b, 4000 Düsseldorf, Fed. Rep. of Germany

[21] Appl. No.: 731,359

[22] Filed: Jul. 15, 1991

Related U.S. Application Data

[63] Continuation of Ser. No. 366,899, Jun. 15, 1989, abandoned.

[30] Foreign Application Priority Data

Jun. 16, 1988 [DE] Fed. Rep. of Germany ....... 3820511

[51] Int. Cl.$^5$ .................. B32B 5/16; B32B 7/00; D03D 13/00
[52] U.S. Cl. .................. 428/240; 428/245; 428/257; 428/258; 428/272; 428/273; 428/311.1; 428/311.5; 428/402; 428/407; 428/902; 428/378
[58] Field of Search ............... 428/240, 402, 372, 257, 428/245, 258, 272, 273, 311.1, 311.5, 407, 378

[56] References Cited
U.S. PATENT DOCUMENTS

| | | | |
|---|---|---|---|
| 3,950,868 | 4/1976 | Holroyd et al. | 428/257 |
| 4,818,583 | 4/1989 | Geel | 428/218 |
| 4,820,575 | 4/1989 | Kölzer | 428/402 |
| 4,879,163 | 11/1989 | Woiceshyn | 428/372 |

FOREIGN PATENT DOCUMENTS 0222399 5/1987 European Pat. Off. .
0276890 8/1988 European Pat. Off. .

Primary Examiner—James D. Withers
Attorney, Agent, or Firm—Sprung Horn Kramer & Woods

[57] ABSTRACT

A reinforcing material for duroplastics made of a web in the form of a woven, non-woven, fiber-woven, or mesh. The web has at least two intersecting and/or interwoven thread systems. One thread system extends mainly across and the other mainly along the web. One thread system partly or completely covers the other. Plastic microspheres with a diameter of 20 to 300 μm are positioned inside the thread systems. The covering thread system contains approximately 60 to 100% by volume of the microspheres.

12 Claims, 2 Drawing Sheets

MATERIAL FOR REINFORCING DUROPLASTICS WOVEN FABRIC FOR REINFORCING DUROPLASTICS HAVING A SPECIFIC DISTRIBUTION OF HOLLOW THERMOPLASTIC MICROSPHERES WITHIN THE THREAD SYSTEM

This application is a continuation of application Ser. No. 366,899, filed Jun. 15, 1989, now abandoned.

Duroplastics are being increasingly employed as fiber composites, which have in particular a considerably higher mechanical load resistance than unreinforced plastics.

Fiber composites occur in the form of webs of fabric and can be woven, non-woven, knitted, or fiber-woven, especially from polyester, polyamide, polypropylene, and/or glass fibers. The web is saturated with a resin or mixture of resins before or during processing. The resins can, strictly by way of example, be the known classical aminoplastics and phenoplastics, epoxide resins, polyester resins, and other reaction resins. They are cured by adding a catalyst to the liquid resin.

Since a web of the aforesaid fiber composites will, when subjected to mechanical load, absorb a large proportion of the applied forces, their high mechanical load resistance can be ascribed to the textile web embedded therein. The specific weight of the fiber composite will accordingly increase with the proportion of web, as is also true of laminates with glass-fiber webs.

Attempts have been made to reduce the specific weight of the fiber composite without decreasing its mechanical strength by replacing some of the resin with a lightweight filler, which is added to the resin. Especially employed are hollow-body fillers, also called microspheres, which can be either organic or inorganic. Due to their hollowness, lightweight fillers considerably reduce the specific weight of the fiber composite.

This procedure, however, is difficult to carry out because mixing the microspheres with the laminating resin is detrimental to the resin's viscosity and its laminating action. It is also impossible to distribute the microspheres throughout the thickness of the laminate very satisfactorily, and they often congregate undesirably near the surface of the composite.

European Patent Publication Number 222 399 describes a reinforcing material with some desirable characteristics. To manufacture a reinforcing material of this type, the web is advanced through a bath of an aqueous suspension that contains unexpanded microspheres. The microspheres accordingly become interspersed between the web's thread systems, which consist of elementary threads. A subsequent heat treatment expands the microspheres within the web, and the increased volume makes it thicker.

Some webs consist of mutually attached or intersecting systems of fibers, with one system mainly extending along the web and the other mainly across it. The aforesaid increase in volume while the reinforcing material is being created can shorten the thread systems in this type of web. The shrinking forces and shrinkage of the lengthwise and transverse thread systems will consequently differ along the width and breadth of the web, and the web will bag undesirably and develop running creases. Bagging and running creases can of course by avoided if the transverse thread systems in the web are prevented from shrinking during the heat treatment, by tentering the web at the edges for example. Still, the tensions solidified into the transverse thread system when the web is subsequently saturated with resins and cured will result in immediate or eventual shrinkage, and the finished-laminated fiber composite will curl or warp undesirably.

The object of the present invention is to provide a material for reinforcing duroplastics of the aforesaid type that will in the form of a web obtain a prescribed desired surface structure.

This object is attained in that the web is provided with a specific structure wherein one thread system partly or completely covers the other. It is simultaneously ensured that approximately 60 to 100% by volume of the microspheres are in the covering thread system.

The aforesaid reinforcing material in accordance with the invention has a number of advantages. Due to the special structure of the web, with one thread system partly or completely covering the other, none or only some of the unexpanded microspheres will enter the covered thread system. The covered thread system will accordingly shrink only slightly if at all due to the expansion of the microspheres during the subsequent heat treatment, whereas the covering thread system, which contains the larger proportion of microspheres, will shrink much further. The shrinkage provoked by the expansion of the microspheres in the reinforcing material in accordance with the invention is accordingly mainly restricted to one direction, resulting in a unidirectionally volume-expanded reinforcing material. Furthermore, no bagging, creasing, or solidification of undesirably high tensions will occur in conjunction with the reinforcing material in accordance with the invention. The reinforcing material constructed in accordance with the invention will consequently exhibit very low boiling-shrinkage or heat-shrinkage values subsequent to the heat-provoked expansion of the microspheres. Furthermore, when the reinforcing material in accordance with the invention is processed into a composite, there will be no subsequent bagging and/or creasing and no undesirable changes in dimension.

The same results can be achieved when longitudinal thread systems that contain approximately 60 to 100% of the unexpanded microspheres and transverse thread systems that contain approximately 40 to 0% of the unexpanded microspheres are employed to produce the web, by weaving, knitting, web laying, or stitch bonding for example, with one thread system partly or completely covering the other. The web of a reinforcing material of this type would mainly shrink longitudinally and without bagging or creasing when the microspheres were heat-expanded. If on the other hand transverse shrinkage were desirable, it would be necessary only to interchange the thread systems such that the system with the higher proportion of unexpanded microspheres would extend transversely and the system with the lower proportion of unexpanded microspheres would extend longitudinally.

European Patent Publication Number 222 399 of the same applicant provides details as to manufacture of thread systems of this type.

An especially low tendency to bag and crease along with outstanding residual shrinkages (boiling and heat shrinkages at 180° C.) is exhibited by one embodiment of the reinforcing material in accordance with the invention wherein the covering thread system has a higher thread density per centimeter than the covered thread system. Since the two thread systems in a reinforcing material of this type move relatively freely in relation to each other, the increased volume and the related shortening of the thread system that occurs due to the expansion of the microspheres during heat treatment does not cause the web to bag and crease undesirably. This type of relationship between the two thread systems makes it possible to create a web that is strong enough to ensure that a fiber composite incorporating such a reinforcing material will have high strength and especially satisfactory elasticity while simultaneously being low in specific weight.

If, in addition, approximately 70 to 90% of the microspheres are in the covering thread system, bagging and running and resting creases will be completely eliminated from the web and there will be no undesired rejection of the finished laminate.

When in another embodiment of the reinforcing material in accordance with the invention all the microspheres are in the covering thread system, the shrinkage of the web provoked by the increase in volume will be confined only to that system. This embodiment of the reinforcing material is preferably employed for webs wherein the two thread systems that constitute the web are secured to each other, by cement for example, at their points of contact. When the covering thread system, which contains the microspheres, shrinks, only the thread density (per unit of length) will increase, without leading to any bagging or creasing.

The covering thread system in the web of another embodiment of the reinforcing material in accordance with the invention consists of a zero-twist multifilament yarn. This measure ensures that, in the previously described method, the main part of the unexpanded microspheres becomes interspersed into that thread system. Furthermore, the shrinkage forces that occur as the volume increases can be partly accommodated by the elasticity of the elementary threads in the multifilament yarn, and a zero-twist multifilament yarn of this type will have less overall shrinkage than a twisted multifilament yarn for example.

A reinforcing material that has a web with a covering thread system made of a zero-twist or only slightly twisted multifilament yarn and that is also highly textured exhibits especially satisfactory properties with respect to shrinkage and hence to the elimination of bagging and creasing. A multifilament yarn of this type has considerably more volume than an untextured multifilament yarn, which not only facilitates interspersal of the unexpanded microspheres but also increases their overall quantity. Furthermore, the texture of a textured yarn of this type can counteract the shrinkage that occurs when the microspheres expand, resulting in essentially less overall shrinkage. This in turn makes it possible for both systems, especially the covering thread system, to have a higher thread density, so that a reinforcing material of this type will have especially high strength and elasticity properties.

The reinforcing material in accordance with the invention can basically have a web with a covered thread system consisting of any multifilament yarn that is appropriate for providing the reinforcing material with the requisite mechanical properties. The covered thread system in the web will preferably consist of multifilament yarns, which usually have a higher strength than spun yarns. Spun yarns on the other hand usually have the advantage, due to their greater or more structured surface, of adhering better to the resin components than multifilament yarns do, which makes the finished laminate resist mechanical stresses better.

The web in a reinforcing material of this type preferably has multifilament or spun yarns with a specific twist of from approximately 300 to approximately 2000 turns per meter in its covered thread system. One result is that fewer microspheres will be accommodated. Another is that a system of twisted threads will stress an essentially smaller area than a system of untwisted threads while simultaneously exhibiting improved strength. The thread systems can accordingly move more freely in relation to each other, decreasing the sensitivity of the web to bagging and creasing.

The covered thread system can for the same reason have a finish that dissolves with difficulty if at all in water, not to increase the strength of the thread system but effectively preventing the penetration of microspheres as well as decreasing the friction between the two systems. Finishes that will occur to one of skill in the art, based for example on derivatives of acrylic or methacrylic acid, polyvinyl alcohol, and/or silicon, can be employed. A finish of this type can also improve the adhesion of the resin to the web in that chemical or physical bonds can be created between them depending on the chemical nature of the resin and of the finish.

Another embodiment of the reinforcing material in accordance with the invention is woven, with the covering thread system paralleling the warp and the covered thread system the weft. Since a woven fabric of this type will shrink, once the microspheres have been interspersed into it and heat treated, essentially or exclusively along the warp, bagging and/or creasing will be prevented.

Depending on how the two thread systems are bonded into the web, it is also possible to obtain specific effects with the reinforcing material in accordance with the invention. If, for example, the web has a linen weave with the covering thread system paralleling the warp and the covered thread system paralleling the weft, interspersing most, 60 to 100%, that is, of the microspheres along the warp and expanding them will result in a reinforcing material that is corrugated along the weft as will be described later with reference to the drawing. Another advantage of this type of reinforcing material is that the corrugations will produce drainage channels between the layers when several layers are secured together to establish a multilayer laminate. The channels will facilitate the flow of resin and the escape of air to ensure a uniform distribution of resin and will provide lower specific weight if air is intentionally left in the channels.

Another embodiment of the reinforcing material in accordance with the invention has a woven web wherein the two thread systems are connected by a floating weave. The covering thread system constitutes, as in the foregoing embodiment, the warp and the covered thread system the weft. It is recommended, to ensure that a woven web of this type will lie especially flat, to make the float symmetrical in relation to the right and left sides of the web, meaning that the weft is intersected by a second, third, or fourth weft thread for example. Due to the relatively slight weaving in of the warp and weft threads, a reinforcing material of this type will have an essentially higher elasticity than the linen-weave material just described.

Depending on the particular field of application, the covering thread system will have a titer between approximately 34 and approximately 1000 tex, preferably 272 tex, with the higher titers of course resulting in greater mechanical load resistance on the part of the reinforcing material. The covered thread system will usually have a titer of between approximately 68 and approximately 1200 tex and especially between approximately 136 and approximately 900 tex. The two thread systems can have the same or approximately the same number of elementary threads, with the covering thread system having an essentially higher number of elementary threads than the covered thread system. The former thread system will usually have between approximately 24 and approximately 60 and preferably between approximately 30 and approximately 40 elementary threads, whereas the latter will have between approximately 10 and approximately 40 and preferably between approximately 24 and approximately 36. The two thread systems will also have different thread densities per centimeter. The covering thread system will preferably have a thread density of between approximately 8 and approximately 40 threads per centimeter and especially between approximately 10 and approximately 30 threads per centimeter, whereas the covered thread system will have one of between approximately 1 and approximately 10 and especially between approximately 4 and approximately 7.

The thread systems usually consist of such known synthetic fibers as polyester, polyamide, and/or polypropylene. Especially appropriate, however, are reinforcing materials with thread systems consisting of glass, carbon, or high-strength synthetic fibers, aramide fibers for example.

The microspheres in the reinforcing material in accordance with the invention are the in-themselves known organic fillers described in European Patent Publication Number 222 399, whereby especially those made of inflated or uninflated thermoplastics based on copolymers of vinylidene chloride and acrylonitrile are interspersed into the thread systems.

In another embodiment of the reinforcing material in accordance with the invention, the thread systems have only partly expanded or unexpanded microspheres. This embodiment is especially intended for industrial-scale production because the material takes up less space and is essentially easier to ship. Its volume can then be increased by heat treatment immediately before being processed, with the design of the two thread systems and the distribution of the microspheres between them in accordance with the invention ensuring a low-bagging and crease-free positioning of the reinforcing material.

Figure 2:
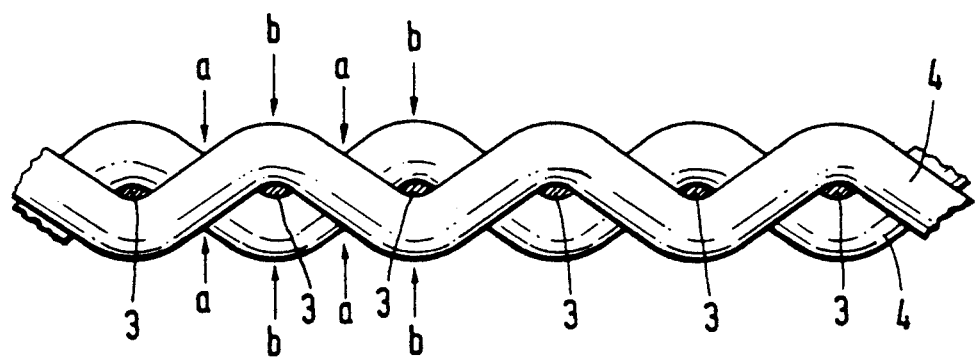
Figure 3:
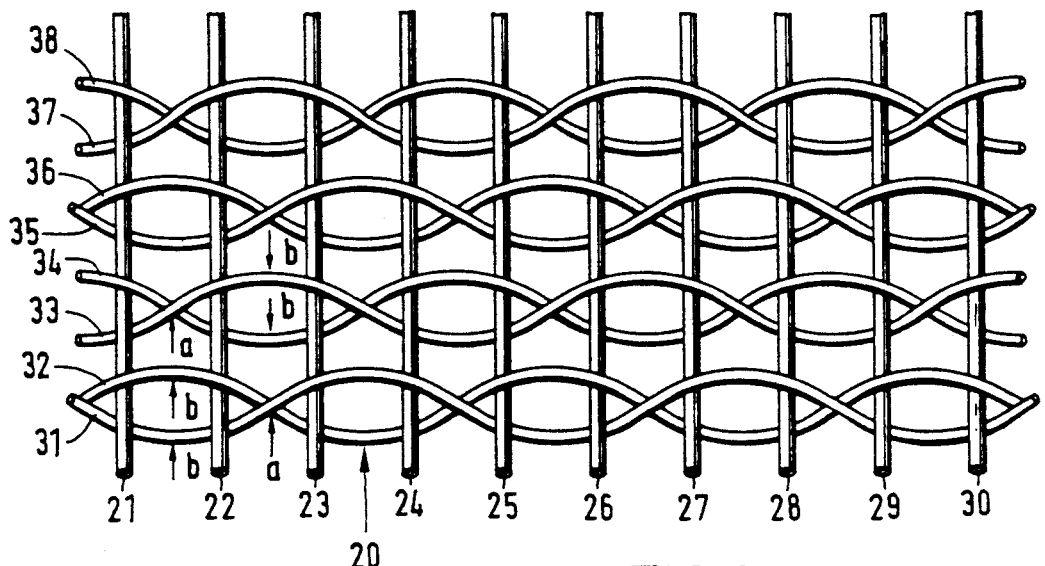
Figure 4:
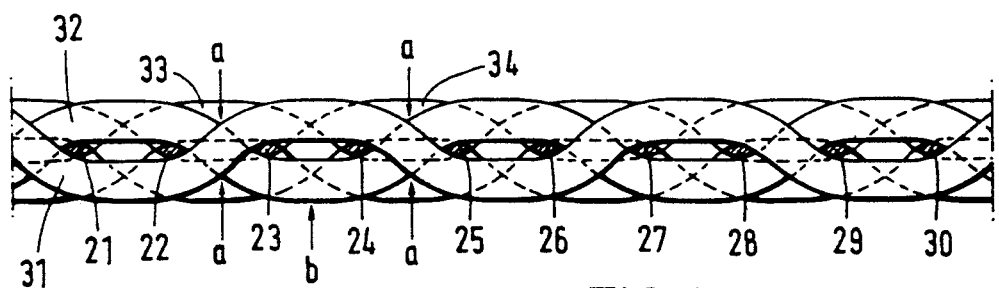

Two embodiments of the invention will now be described in detail with reference to the drawing, wherein FIG. 1 is a schematic perspective view of part of one embodiment of a reinforcing material before being expanded, FIG. 2 is a schematic section through the embodiment illustrated in FIG. 1 after being expanded, FIG. 3 is a schematic perspective view of part of another embodiment of a reinforcing material before being expanded, and FIG. 4 is a schematic section through the embodiment illustrated in FIG. 3 after being expanded.

As will be evident from FIGS. 1 and 2, one embodiment of the reinforcing material has a web 2, which is woven in the present case. Web 2 has a linen weave, with its weft 3 constituting a covered thread system and its warp 4 a covering thread system. Warp 4 is made of a multifilament yarn, with individual capillaries 4a and 4b, which consist of glass fibers, being indicated only schematically at the forward surface of the section. The warp in the embodiment of the reinforcing material in accordance with Example 1 has a density of 13 threads per centimeter and a titer of 92 tex.

The weft, which also consists of a multifilament yarn made of glass fibers, has a titer of 160 tex and a thread density of 2 threads per centimeter.

Once the unexpanded microspheres of a copolymer of vinylidene chloride and acrylonitrile have been interspersed into web 2, approximately 90% by volume of the microspheres are inside warp 4, with weft 3 accordingly having approximately 10% by volume (3 g/m$^2$).

When the reinforcing material illustrated in FIG. 1 with the unexpanded microspheres is heat-treated, at a temperature between approximately 140° and approximately 160° C. for example, the microspheres, which are distributed between the elementary threads in the thread systems will expand, leading to an enormous increase in volume. The threads in warp 4 will simultaneously shrink in the direction indicated by arrow 5 by approximately 5 cm per meter, whereas the length of those in weft 3 will not change in the direction indicated by arrow 6. The result is, as will be evident from the section illustrated in FIG. 2, a very voluminous web.

FIG. 2 illustrates the expanded state of the reinforcing material illustrated in FIG. 1. The figure shows two threads in warp 4 and six in weft 3. Warp 4 constitutes the covering thread system in the embodiment illustrated in FIGS. 1 and 2, and weft 3 the covered thread system. Due to the expanded microspheres that are interspersed among them, the threads in warp 4 (FIG. 2) have a much greater volume than the threads in weft 3. The particular interweaving of the warp and weft threads and the difference between their volumes recesses the material at the point of intersection, labeled a in FIGS. 1 and 2, between the threads in the embodiment illustrated in those figures. Adjacent to this point is a region b where the material is elevated. Adjacent to each point b is another point a, followed by another point b, etc. The aforesaid structure of web 2 in conjunction with the distribution of the microspheres mainly in the warp allows the warp to shrink essentially freely as the microspheres expand, eliminating undesirable frozen-in tensions and preventing bagging and/or creasing. Although the embodiment illustrated in FIG. 2 is accordingly corrugated as viewed sectionally, it will look like a unidirectionally voluminized web when viewed from above.

When, now, a reinforcing material of this type is laid out in several layers for lamination, drain-like hollows will be left between the individual layers at points a, not only ensuring good air removal while the material is being saturated with the resin but also leaving additional spaces between the individual layers if desired to reduce even further the specific weight of a fiber composite of this type. Such a layer of air will also increase resilience while simultaneously improving heat insulation.

The web 20 in the embodiment illustrated in FIGS. 3 and 4 is also woven and consists of glass fibers. The web has weft threads 21 through 30 and warp threads 31 through 38 that are woven together in a floating weave. The weave is structured such that each warp thread 31 through 38, the threads that constitute the covering thread system, alternatively interlace weft threads 21 through 30 from the upper and lower surface of the material. Thus, warp thread 38 interlaces, first, pair 22 and 23 of weft threads from the bottom of the web, second, pair 24 and 25 of weft threads from the top of the web, third, pair 26 and 27 of weft threads from the bottom again, and, fourth, pair 28 and 29 of weft threads from the top again. The next thread 37 interlaces, first, pair 22 and 23 of weft threads from the top of the web, second pair 24 and 25 of weft threads from the bottom of the web, third, pair 26 and 27 of weft threads from the top of the web, and, fourth, pair 28 and 29 of weft threads from the bottom of the web, as will be evident from the section of web illustrated in FIG. 3. The warp thread 33 in the section of web illustrated in FIG. 3 interlaces, first, weft thread 21 from below, second, pair 22 and 23 of weft threads from above, third, pair 24 and 25 of weft threads from below, fourth, pair 26 and 27 of weft threads from above, fifth, pair 28 and 29 of weft threads from below, and, finally, weft thread 30 from above, whereas warp thread 34 interlaces, first, weft thread 21 from above, second, pair 22 and 23 of weft threads from below, third, pair 24 and 25 of weft threads from above, fourth, pair 26 and 27 of weft threads from below, fifth, pair 28 and 29 of weft threads from above, and, finally, weft thread 30 from below. The interlacing of the weft threads continues in the same way with warp thread 35 corresponding to warp thread 31, warp thread 36 to warp thread 32, warp thread 37 to warp thread 33, and warp thread 38 to warp thread 34. The aforesaid interlace between warp threads and weft threads can generally be described by saying that each warp thread 31 through 38 skips two weft threads 21 through 39, whereby the point a of intersection between each pair of warp threads (e.g. 31 & 32 or 33 & 34) is displaced one weft thread from the points a of intersection of the adjacent pair of warp threads (e.g. 31 & 32 in relation to 33 and 34). This structure ensures that the constrictions resulting from the intersection of the warp threads in regions a will be covered by the parallel warp threads on the bottom and top of the web.

This again leads to the reinforcing material having an almost flat and board-like surface in the expanded state as illustrated in FIG. 4. It will be obvious from that figure that the regions a in which the warp threads intersect and wherein there will be recesses in the material once it has been expanded as previously described herein with reference to FIGS. 1 and 2, will be covered by the regions b of the adjacent pairs of warp threads and wherein there will occur elevations in the material as previously described herein with reference to FIGS. 1 and 2. Also as previously described herein with reference to FIG. 2, the weft threads 21 through 30 in the embodiment illustrated in FIG. 4 will be only minimally expanded if at all, whereas the volume of warp threads 31 through 38 will be powerfully enlarged.

The warp material in this embodiment is a multifilament yarn with a titer of 68 tex and a density of 25 threads per cm. The weft material has a titer of 300 tex and a density of 3 threads per cm. The warp material contains 90% by volume (36 g/m$^2$) of the microspheres and the weft 10% by volume (4 g/m$^2$).

It will be understood that the specification and examples are illustrative but not limitative of the present invention and that other embodiments within the spirit and scope of the invention will suggest themselves to those skilled in the art.

What is claimed is:

1. In a reinforcing material for duroplastics comprising a woven web, having at least two interwoven thread systems and hollow thermoplastic microspheres with a diameter of 20 to 300 μm positioned inside the thread systems, the improvement wherein the woven web has a floating weave, of warp and weft threads wherein each warp thread skips two weft threads so that particular points (a) of intersection of one pair of warp threads are displaced one weft thread from points (a) of intersection of an adjacent pair of warp threads, the thread system extending in the warp direction containing approximately 60 to 100% by volume of the microspheres and covering at least partly the thread system extending in the weft direction containing 40 to 0% by volume of the microspheres, the reinforcing material having an almost flat and board-like surface.

2. A reinforcing material according to claim 1, wherein the warp thread system has a higher thread density per cm than the weft thread system.

3. A reinforcing material according to claim 1, wherein the warp thread system contains approximately 70 to 90% by volume of the microspheres.

4. A reinforcing material according to claim 1, wherein the warp thread system comprises zero-twist multifilament fibers selected from the group consisting of glass fibers, carbon/fibers and aromatic-polyamide fibers.

5. A reinforcing material according to claim 1, wherein the warp thread system comprises multifilament fiber.

6. A reinforcing material according to claim 1, wherein the weft thread system has a twist of between approximately 300 and approximately 2000 turns per meter.

7. A reinforcing material according to claim 1, wherein the weft thread system has a finish that is essentially water insoluble.

8. A reinforcing material according to claim 1, wherein the warp thread system has a titer of between 34 and 1000 tex and the weft thread system has a titer of between 68 and 1200 tex.

9. A reinforcing material according to claim 1, wherein the warp thread system has a titer of between 34 and 272 tex and the weft thread system has a titer of between 136 and 900 tex.

10. A reinforcing material according to claim 1, wherein the warp thread system has a density of between 8 and 40 threads per cm and the weft thread system has a density of between 1 and 10 threads per cm.

11. A reinforcing material according to claim 1, wherein the warp thread system has a density of between 10 and 30 threads per cm and the weft thread system has a density of between 4 and 7 threads per cm.

12. A lightweight laminate including a duroplastic based on a reinforcing material according to claim 1.

* * * * *